(12) United States Patent
Sasaki et al.

(10) Patent No.: US 10,872,229 B2
(45) Date of Patent: Dec. 22, 2020

(54) IMAGE PROCESSING DEVICE, IMAGE PROCESSING METHOD, AND RECORDING MEDIUM

(71) Applicant: CASIO COMPUTER CO., LTD., Tokyo (JP)

(72) Inventors: Kyosuke Sasaki, Koganei (JP); Takao Nakai, Fussa (JP); Daiki Yamazaki, Musashino (JP); Takeharu Takeuchi, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 138 days.

(21) Appl. No.: 16/159,292

(22) Filed: Oct. 12, 2018

(65) Prior Publication Data

US 2019/0114466 A1  Apr. 18, 2019

(30) Foreign Application Priority Data

Oct. 12, 2017  (JP) ................................ 2017-198578

(51) Int. Cl.
*G06K 9/00* (2006.01)
*G06T 7/11* (2017.01)
*G06T 5/00* (2006.01)

(52) U.S. Cl.
CPC ..... *G06K 9/00234* (2013.01); *G06K 9/00275* (2013.01); *G06K 9/00281* (2013.01); *G06T 5/005* (2013.01); *G06T 7/11* (2017.01); *G06T 2207/10024* (2013.01); *G06T 2207/30201* (2013.01)

(58) Field of Classification Search
CPC ........... G06K 9/00234; G06K 9/00275; G06K 9/00281; G06T 7/11; G06T 5/005; G06T 2207/10024; G06T 2207/30201
See application file for complete search history.

(56) References Cited

U.S. PATENT DOCUMENTS 10,621,754 B2 * 4/2020 Sato .................... G06F 16/5838
2016/0071236 A1 * 3/2016 Sato .................... G06K 9/00228
382/282

FOREIGN PATENT DOCUMENTS

| JP | 11073498 A | 3/1999 |
| JP | 2000105815 A | 4/2000 |
| JP | 2013090751 A | 5/2013 |
| JP | 2015159975 A | 9/2015 |
| JP | 2016051302 A | * 4/2016 |

OTHER PUBLICATIONS

A New Method for Face Recognition Using Convolutional Neural Network; Patrik Kamencay, Miroslav Benco, Tomas Mizdos, Roman Radil; Department of Multimedia and Information-Communication Technologies, Faculty of Electrical Engineering, University of Zilina, Univerzitna 8215/1, 010 26 Zilina, Slovakia (Year: 2017).*

* cited by examiner

*Primary Examiner* — Khai M Nguyen
(74) *Attorney, Agent, or Firm* — Holtz, Holtz & Volek PC

(57) ABSTRACT

An image processing device includes an acquirer which acquires a face image and a controller. The controller generates an image depicted by at least one of multiple kinds of parameter making up a color space on a basis of the face image acquired by the acquirer, detects a particular image region in the generated image by setting multiple sizes, and sets the detected image region as a region on which a designated processing is to be performed.

11 Claims, 6 Drawing Sheets

IMAGE PROCESSING DEVICE, IMAGE PROCESSING METHOD, AND RECORDING MEDIUM

BACKGROUND OF THE INVENTION

Field of the Invention

The present invention relates to an image processing device, an image processing method, and a recording medium.

Description of the Invention

Techniques for retouching face images have been proposed, conventionally. For example, Japanese Unexamined Patent Application Publication No. H11-73498 describes a technique to aestheticize skin (remove moles), and to make skin fair or tanned. As for the removal of moles, it is described that a partial region with pixels different from the surrounding pixels is detected and assumed to be a mole. Then the pixels are replaced by the surrounding pixels.

SUMMARY OF THE INVENTION

In general, in one aspect, the invention relates to an image processing device including:
an acquirer which acquires a face image; and
a controller,
wherein the controller generates an image depicted by at least one of multiple kinds of parameter making up a color space on a basis of the face image acquired by the acquirer, detects a particular image region in the generated image by setting multiple sizes, and sets the detected image region as a region on which a designated processing is to be performed.

In general, in one aspect, the invention relates to an image processing device including:
an acquirer which acquires a face image; and
a controller,
wherein the controller generates an image depicted by at least one of multiple kinds of parameter making up a color space on a basis of the face image acquired by the acquirer, detects a particular image region in the generated image, and sets the detected image region as a region on which a designated processing is to be performed on a basis of a size of the detected particular image region.

In general, in one aspect, the invention relates to an image processing method including:
acquiring a face image;
generating an image depicted by at least one of multiple kinds of parameter making up a color space on a basis of the face image acquired in the acquiring;
detecting a particular image region in the image generated in the generating by setting multiple sizes; and
setting the image region detected in the detecting as a region on which a designated processing is to be performed.

In general, in one aspect, the invention relates to an image processing method including:
acquiring a face image;
generating an image depicted by at least one of multiple kinds of parameter making up a color space on a basis of the face image acquired in the acquiring;
detecting a particular image region in the image generated in the generating; and
setting the image region detected in the detecting as a region on which a designated processing is to be performed on a basis of a size of the particular image region.

In general, in one aspect, the invention relates to a computer readable recording medium storing a program which causes a computer to:
acquire a face image;
generate an image depicted by at least one of multiple kinds of parameter making up a color space on a basis of the face image acquired in the acquiring;
detect a particular image region in the image generated in the generating by setting multiple sizes; and
set the image region detected in the detecting as a region on which a designated processing is to be performed.

In general, in one aspect, the invention relates to a computer readable recording medium storing a program which causes a computer to:
acquire a face image;
generate an image depicted by at least one of multiple kinds of parameter making up a color space on a basis of the face image acquired in the acquiring;
detect a particular image region in the image generated in the generating; and
set the image region detected in the detecting as a region on which a designated processing is to be performed on a basis of a size of the particular image region.

DETAILED DESCRIPTION OF THE PREFERRED EMBODIMENTS

Figure 1:
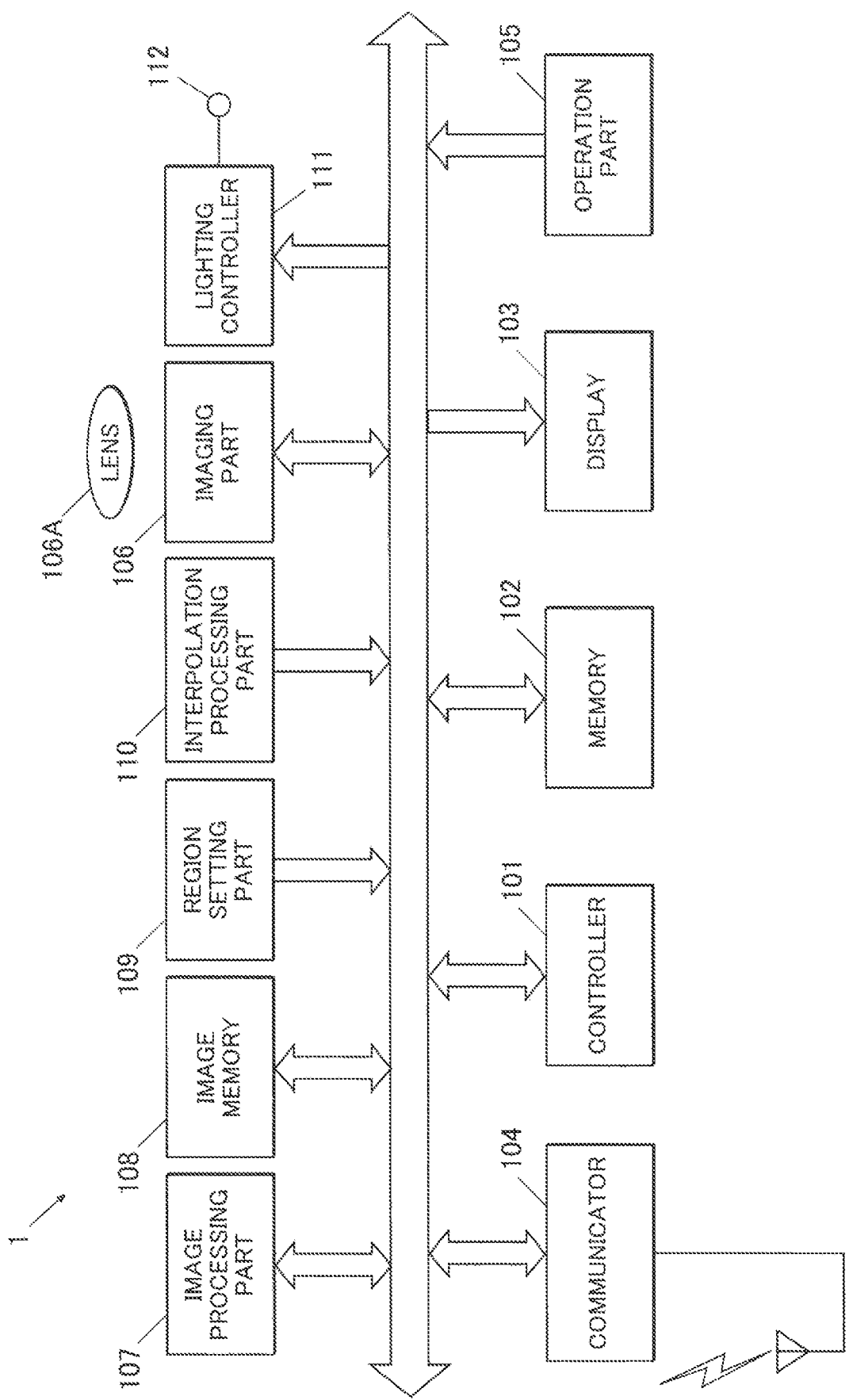
FIG. 1 is a block diagram showing a functional configuration of the imaging device in accordance with the present embodiment.

Hereinafter an embodiment in accordance with the present invention is described in detail with reference to the drawings. The scope of the present invention is not limited to the examples shown in the drawings.

[Configuration of the Imaging Device 1]

FIG. 1 is a block diagram showing a functional configuration of the imaging device 1 according to the present embodiment. As shown in FIG. 1, the imaging device 1 is configured with a controller 101, a memory 102, a display 103, a communicator 104, an operation unit 105, an imaging part 106, an image processor 107, an image memory 108, a region setting part 109, an interpolation processing part 110, a lighting controller 111, an illuminator 112, etc. The controller 101 and each part are connected with each other by a bus.

The controller 101 is configured with a CPU (Central Processing Unit), a RAM (Random Access Memory), etc., and executes various programs stored in the memory 102 to perform designated calculations and to control each part.

The memory 102 is configured with a non-volatile semiconductor memory, a hard disk, etc. In the memory 102, the system programs executed in the controller 101, various processing programs, data necessary for executing the programs, etc. are stored.

The display 103 is configured with an LCD (Liquid Crystal Display), etc., and displays, according to the display controlling signals from the controller 101, live-view images to show the scene imaged by the imaging part 106, or images obtained by the imaging part 106 according to the imaging commands, for example.

The communicator 104 is an interface to perform wired or wireless data communication with external devices.

The operation part 105 includes various functional buttons such as a shutter button, receives input of pushing each button from the user, and outputs the operation information to the controller 101.

The imaging part 106 is configured with an imaging lens 106A, an imaging element including an image sensor such as a CCD (Charge Coupled Device) or a CMOS (Complementary Metal-oxide Semiconductor), etc. not shown in the drawings, an A/D conversion circuit, etc., and converts an optical image passing through the imaging lens 106A into two-dimensional image signals by imaging elements, and acquires image data (RBG image data).

The image processor 107 performs color processing including pixel interpolation processing and gamma correction processing on the RGB data obtained by the imaging part 106, and then converts the data into the image data of digital values of luma signal Y and chrominance (color difference) signals Cb and Cr (image data of components Y, U, and V). The image processor 107 performs beauty skin retouch processing such as designated smoothing processing on the skin color region in the converted image data when the beauty skin retouch mode is set. The beauty skin retouch mode is a mode where the beauty skin retouch processing is performed on the image data obtained by the imaging part 106.

The image memory 108 is a recording means which is configured with a flash memory, etc., for example, and stores image data imaged by the imaging part 106 and processed by the image processor 107.

The region setting part 109 detects a particular region (melasma region, mole region) in the image data which is obtained by the imaging part 106 and on which the beauty skin retouch processing is performed by the image processor 107, and sets the detected particular region as a processing object region of the interpolation processing, when the beauty skin retouch mode is set.

The interpolation processing part 110 performs the interpolation processing on the processing object region set by the region setting part 109 in the image data which is obtained by the imaging part 106 and on which the beauty skin retouch processing is performed by the image processor 107. In the present embodiment, the interpolation processing part 110 performs the interpolation processing using the surrounding pixels on the processing object region, such that melasma and moles are removed and the skin looks smooth.

The processing of the region setting part 109 and the interpolation processing part 110 is done by the controller 101 and the programs stored in the memory 102 cooperating, or alternatively, done by a dedicated hardware.

The lighting controller 111 (driver) is connected to each of LEDs of the illuminator 112, and controls volume and on/off of light of the illuminator 112 according to the command from the controller 101.

The illuminator 112 is configured with LEDs, etc. and irradiates light on the object.

[Operation of Imaging Device 1]

Next, the operations of the region setting part 109 and the interpolation processing part 110 of the imaging device 1 are explained.

Figure 2:
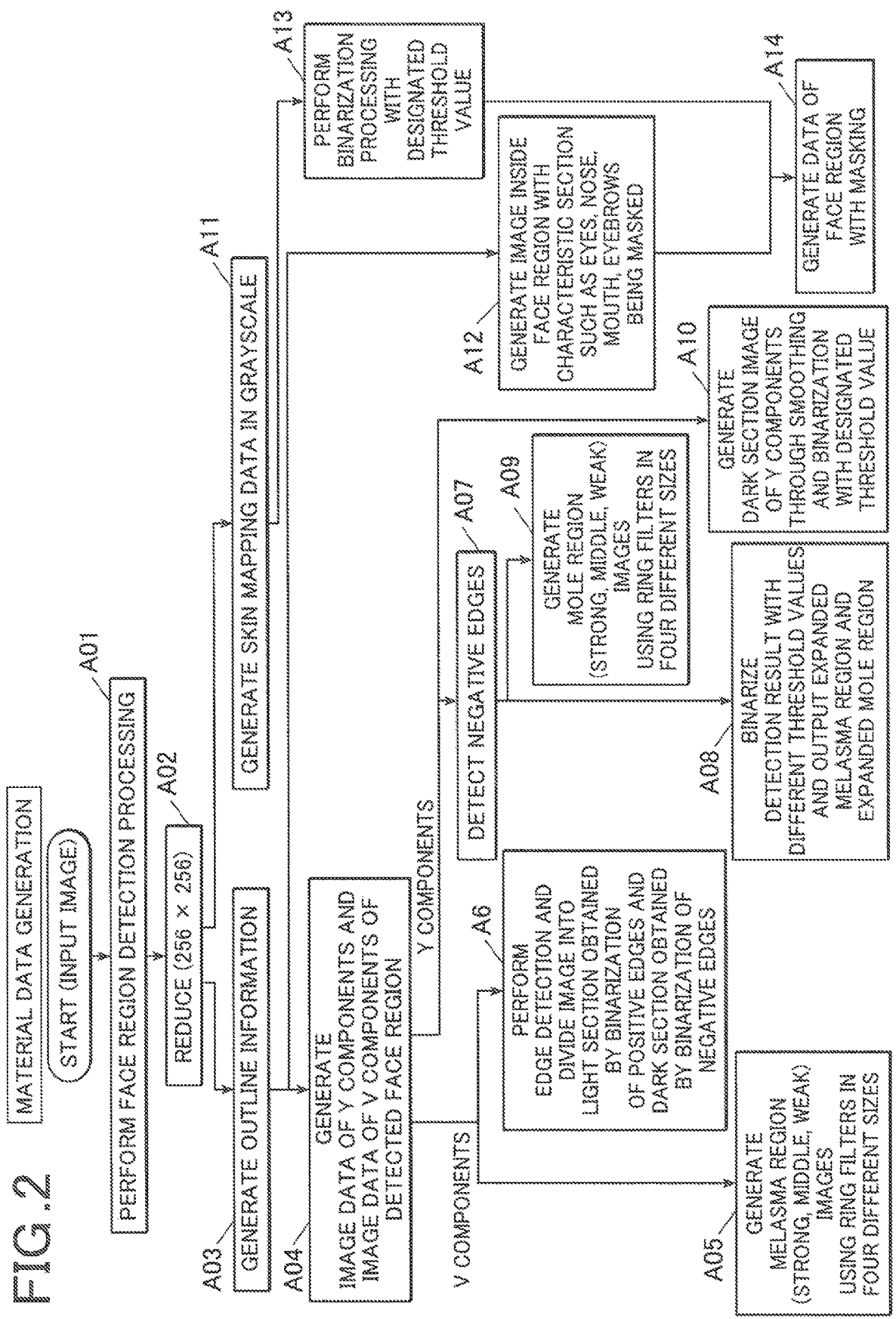
FIG. 2 is a flowchart showing a process of the material data generation processing executed by the region setting part in FIG. 1.

The region setting part 109 generates material data on the basis of which melasma regions of acne or pimple, and mole regions are detected in the image data (input image) which is input from the image processing part 106 and on which the beauty skin retouch processing such as the designated smoothing processing is performed by the image processor 107 (see FIG. 2). The region setting part 109 next performs extraction of the melasma regions (see FIG. 3) and extraction of the mole regions (see FIG. 4). The region setting part 109 then integrates the melasma regions and the mole regions, and sets the integration result as the processing object region of the interpolation processing (see FIG. 5).

Figure 6:
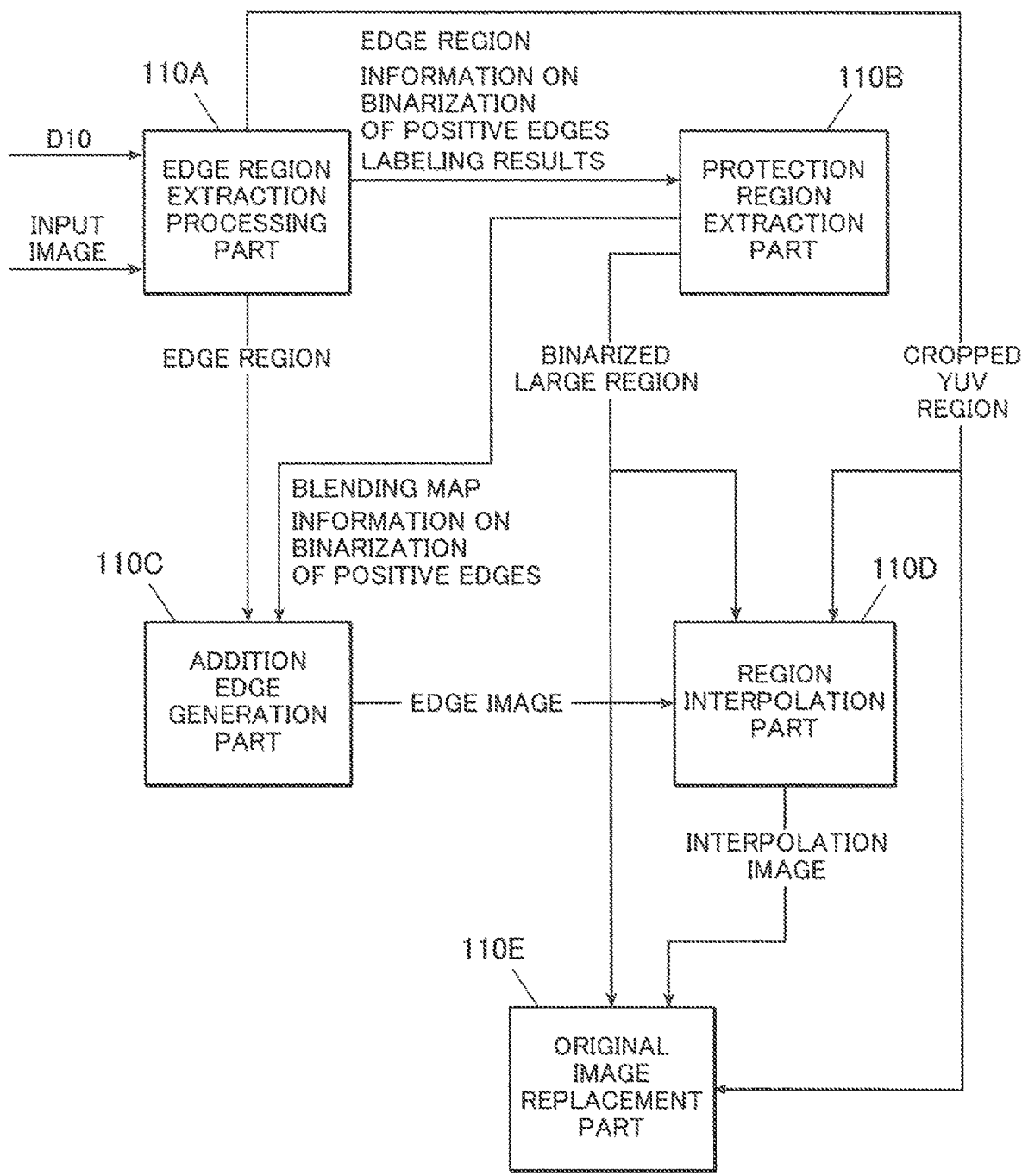
FIG. 6 shows a data flow in each functional part of the interpolation processing part in FIG. 1.

The interpolation processing part 110 performs the interpolation processing in the processing object region set by the region setting part 109 (see FIG. 6).

Hereinafter the processing performed by the region setting part 109 and the interpolation processing part 110 is explained.

(Material Data Generation)

First, the processing of material data generation performed by the region setting part 109 is explained with reference to FIG. 2.

The region setting part 109 first performs the face region detection processing on the input image (Step A01). The face region detection processing can be performed, for example, using a known image processing technique such as pattern recognition, etc.

Next, the region setting part 109 cuts out and reduces an image of the detected face region (face image) (Step A02). It is reduced in 256 pixels×256 pixels here.

The region setting part 109 then generates outline information of the face region of the face image (Step A03), and generates image data of Y components and image data of V components of the detected face region (inside the outline) (Step A04).

Next, the region setting part 109 performs detection on the image data of V components generated at Step A04, using ring filters in four different sizes stored in the memory 102, and generates images of melasma regions (strong, middle, weak) by classifying the regions which are detected by two filters on the basis of the predetermined threshold values (Step A05). The ring filters used here are ring-shaped filters which compare the pixel value of a coordinate point with the pixel values of the maximum pixel value of the surrounding group of coordinate points, and detect coordinate points which have the difference larger than the reference value.

The region setting part 109 performs edge detection on the image data of V components generated at Step A04, and divides the image data into the light section obtained by the binarization of the detected positive edges and the dark section obtained by the binarization of the detected negative edges (Step A06).

The region setting part 109 also detects the negative edges of the image data of Y components generated at Step A04 (A07), binarizes the detected edge regions on the basis of predetermined two different threshold values, and outputs the regions as the expanded melasma region or the expanded mole region (Step A08). The region setting part 109 performs detection in the edge regions detected at Step A07, using the ring filters in four different sizes stored in the memory 102, and generates images of mole regions (strong, middle, weak) by classifying the regions which are detected by two filters on the basis of the predetermined threshold values (Step A09).

The region setting part 109 also smooths the image data of Y components generated at Step A04 and binarizes the image data by the predetermined threshold value to generate the image of the dark section of Y components (Step A10).

The region setting part 109 specifies the characteristic sections such as eyes, a nose, a mouth, eyebrows, etc. on the basis of the outline information detected at Step A03, and generates an image of the inside of the face region with the characteristic sections being masked (Step A12). The region setting part 109 converts the reduced image of face region to gray scale to generate skin mapping data (Step A11), and binarizes the skin mapping data by the designated threshold value (Step A13). The data of skin region with masking is generated (Step A14). The data of skin region with masking is the region where both of the image of the inside of the face region with the characteristic sections being masked generated at Step A12 and the image which is obtained by binarization of the skin mapping data with the designated threshold value generated at Step A13 overlap.

The material data for detecting the melasma regions and mole regions is generated at Steps A01 to A14 above.

(Extraction of Melasma Region)

Figure 3:
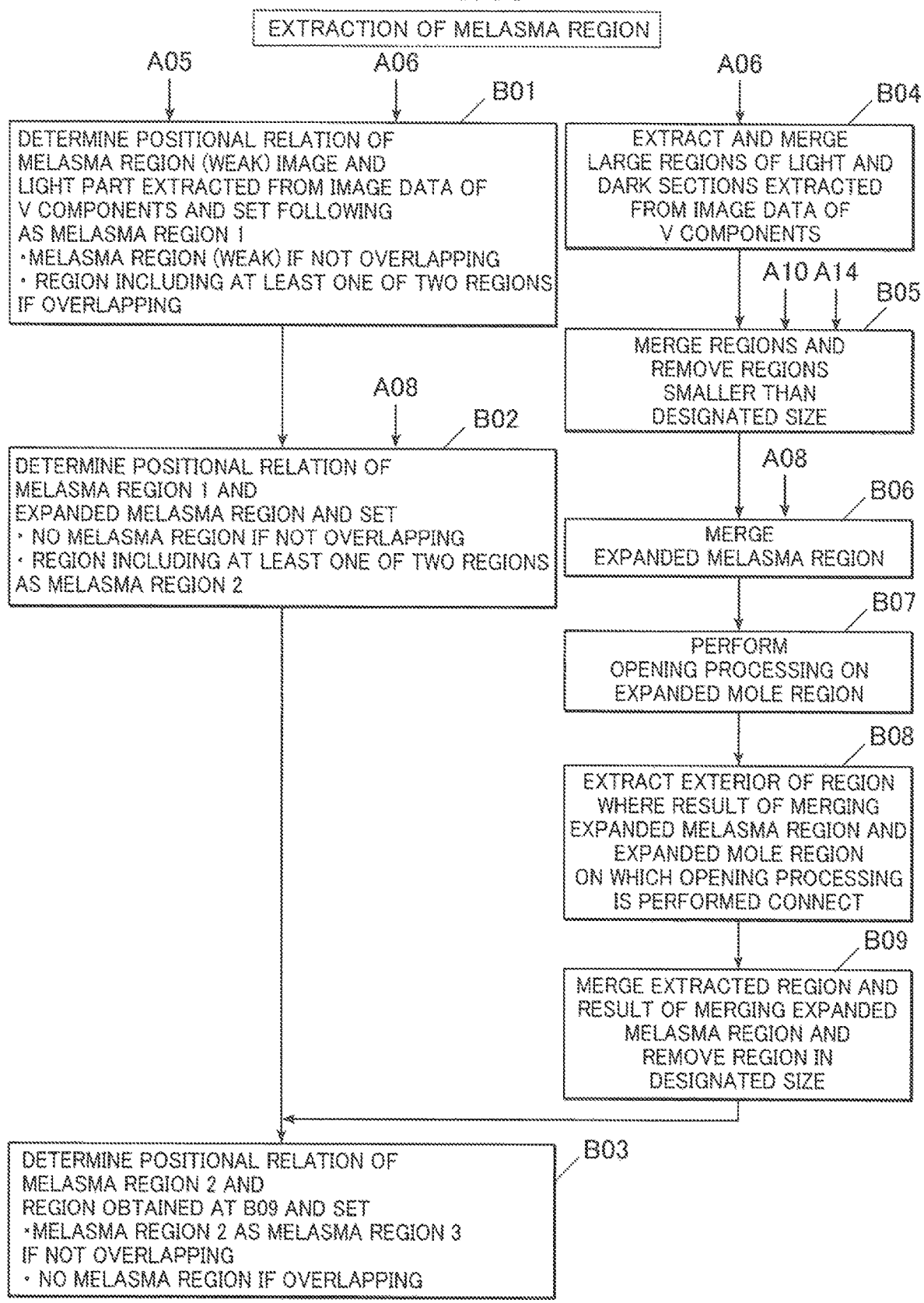
FIG. 3 is a flowchart showing a process of the melasma region extraction processing executed by the region setting part in FIG. 1.

Next, the processing of extraction of melasma region in the region setting part 109 is explained with reference to FIG. 3.

First, the region setting part 109 determines the positional relation of the melasma region (weak) image generated at Step A05 and the extraction result of the light section of image data of V components generated at Step A06. If they do not overlap, the melasma region (weak) is set as a melasma region 1, and if they overlap, the region which includes at least one of those is set as a melasma region 1 (Step B01).

Next, the region setting part 109 determines the positional relation of the melasma region 1 generated at Step B01 and the expanded melasma region generated at Step A08. If they do not overlap, they are set as a non-melasma region, and if they overlap, the region which includes at least one of them is set as a melasma region 2 (Step B02).

The region setting part 109 extracts and merges the large regions (regions larger than the predetermined size) of the light and dark sections of the image data of V components generated at Step A06 (Step B04). The region setting part 109 then merges the region obtained at Step B04, the dark section image of Y components generated at Step A10, and the data of skin region with masking, and excludes the regions smaller than the designated size (Step B05). Next, the image obtained at Step B05 and the expanded melasma region generated at Step A08 are merged (Step B06).

Next, the region setting part 109 performs opening processing in the expanded mole region generated at Step A08 (Step B07), and extracts the exterior of the region where the image generated at Step B06 and the expanded mole region on which the opening processing is performed connect (Step B08). The region setting part 109 then merges the extracted region and the region obtained by the merging at Step B06, and removes the region smaller than the designated size (Step B09).

The region setting part 109 determines the positional relation of the melasma region 2 set at Step B02 and the region obtained at Step B09. If they do not overlap, the melasma region 2 is set as the melasma region 3, and if they overlap, they are set as non-melasma regions (Step B03).

(Extraction of Mole Region)

Figure 4:
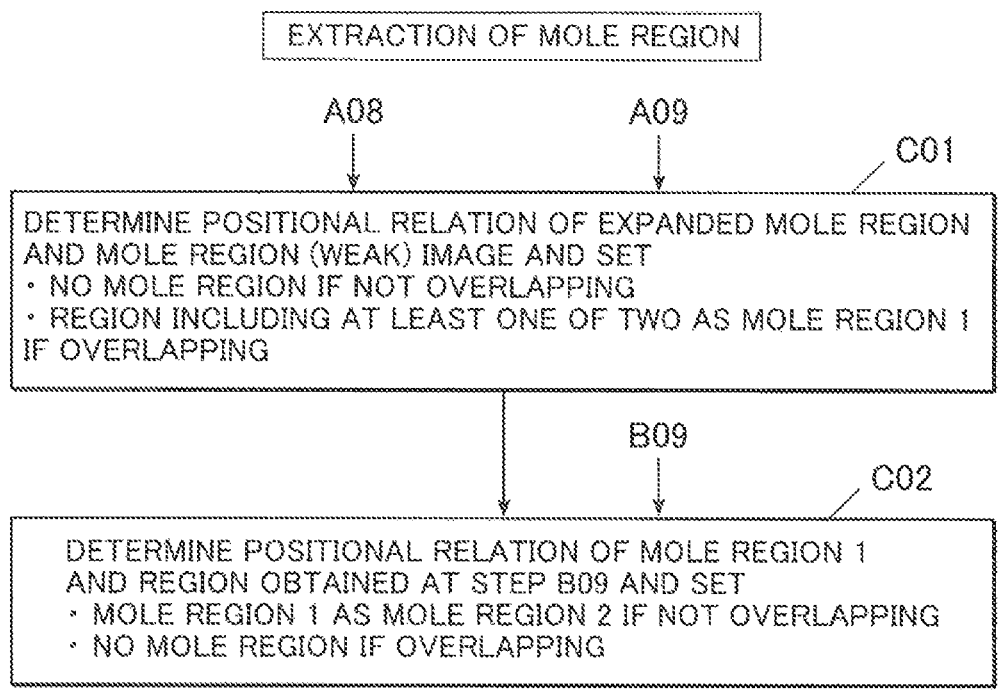
FIG. 4 is a flowchart showing a process of the mole region extraction processing executed by the region setting part in FIG. 1.

Next, the processing of extraction of mole region in the region setting part 109 is explained with reference to FIG. 4.

First, the region setting part 109 determines the positional relation of the expanded mole region generated at Step A08 and the image of the mole region (weak) generated at Step A09. If they do not overlap, they are set as non-mole regions, and if they overlap, the region which includes at least one of them is set as a mole region 1 (Step C01).

Next, the region setting part 109 determines the positional relation of the mole region 1 and the region obtained at Step B09. If they do not overlap, the mole region 1 is set as a mole region 2, and if they overlap, it is set as a non-mole region (Step C02).

(Integration Processing)

Figure 5:
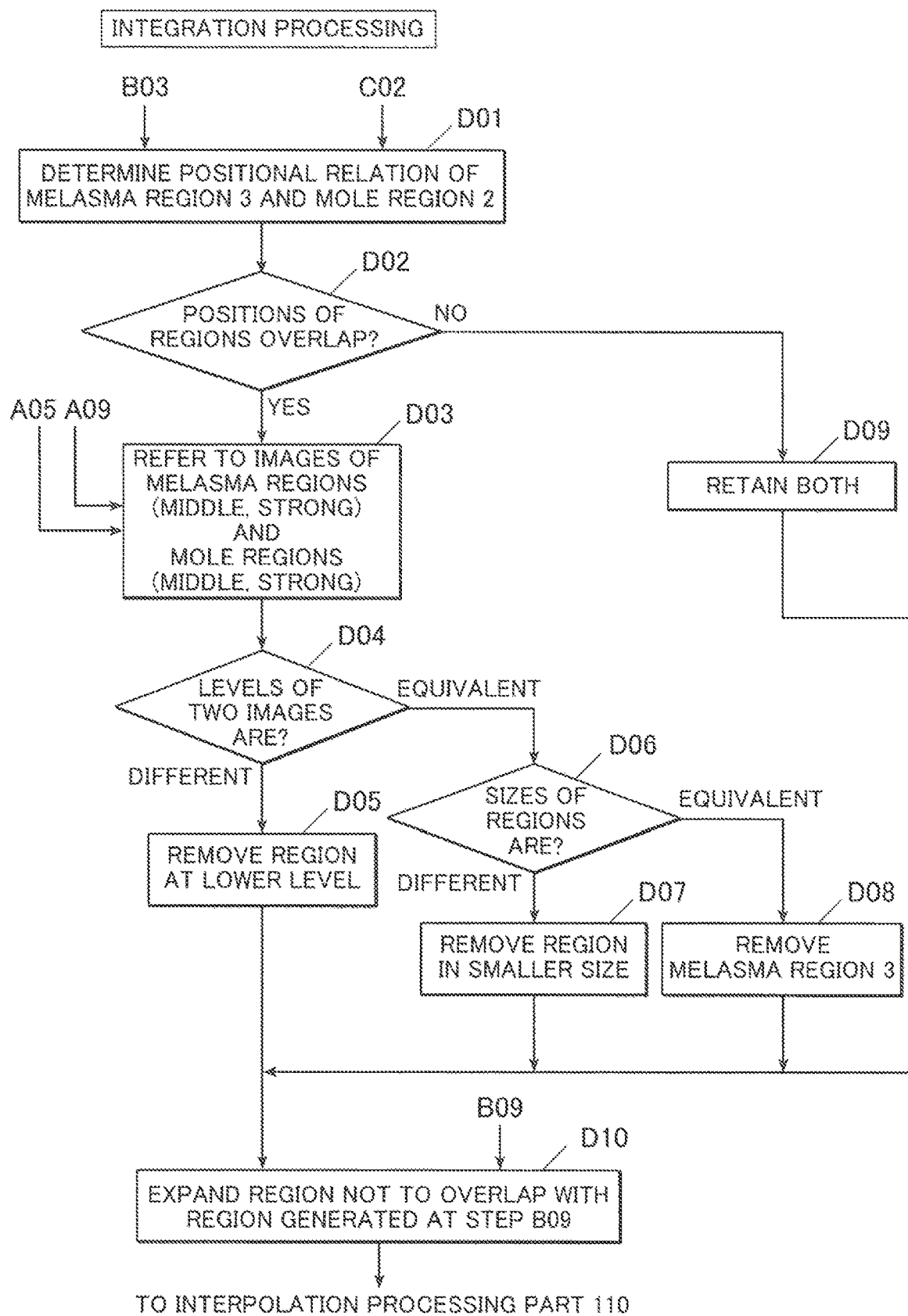
FIG. 5 is a flowchart showing a process of the integration processing executed by the region setting part in FIG. 1.

Next, the integration processing is explained with reference to FIG. 5, where the melasma region 3 and the mole region 2 are integrated and set as the processing object region of the interpolation processing.

First, the region setting part 109 determines the positional relation of the melasma region 3 set at Step B03 and the mole region 2 set at Step C02 (Step D01). As for the region where the melasma region 3 and the mole region 2 overlap (Step D02; YES), the region setting part 109 refers to the melasma region (middle, strong) images generated at Step A05 and the mole region (middle, strong) images generated at Step A09 (Step D03) to determine whether the levels of the melasma region 3 and the mole region 2 are equivalent or different (Step D04).

If it is determined that the levels of the melasma region 3 and the mole region 2 are different (Step D04; different), the region setting part 109 excludes the region with the smaller intensity (Step D05), and the process proceeds to Step D10.

If it is determined that the levels of the melasma region 3 and the mole region 2 are equivalent (Step D04; equivalent), the region setting part 109 compares the melasma region 3 and the mole region 2 in terms of size (Step D06). If it is determined that the melasma region 3 and the mole region 2 are different in size (Step D06; different), the region setting part 109 excludes the region smaller in size (Step D07), and the process proceeds to Step D10. If it is determined that the melasma region 3 and the mole region 2 are equivalent in size (Step D06; equivalent), the region setting part 109 excludes the melasma region 3 (Step D08), and the process proceeds to Step D10.

On the other hand, as for the region where the melasma region 3 and the mole region 2 do not overlap at Step D02 (Step D02; NO), both regions are retained (Step D09), and the process proceeds to Step 10.

At Step D10, the region setting part 109 expands each region obtained at Step D5, D7, D8 or D9, such that they do not overlap with the region obtained at Step B09 in the data of skin region with masking. The region setting part 109 then sets those regions as the processing object regions of the interpolation processing (Step D10). This prevents the melasma region and the mole region from overlapping, and allows the processing object region to be set without being superimposed on the characteristic sections like eyes, nose, mouth, etc.

(Interpolation Processing)

Next, the process of the interpolation processing of the interpolation processing part 110 on the processing object region set in the processing region setting part 109 is explained with reference to FIG. 6.

The functions of the interpolation processing part 110 are classified to five blocks, the edge region extraction processing part 110A, the protection region extraction part 110B, the addition edge generation part 110C, the region interpolation part 110D, and the original image replacement part 110E.

First, in the edge region extraction processing part 110A, the rectangular positional information of each processing object region set at Step D10 is resized into the size of the original image (face image before downsizing), oval masks are generated inside the rectangles after resizing, and each processing object region (called YUV region) is cropped from the original image with the generated oval masks. Each of the YUV regions cropped is output in the region interpolation part 110D and the original image replacement part 110E.

In the edge region extraction processing part 110A, the extraction of edges is performed in each of the cropped YUV regions, and the extracted edge regions are output to the addition edge generation part 110C. The extracted positive edges are binarized, and the edge regions and the information on the binarization of the positive edges are output to the protection region extraction part 110B. Further, the extracted negative edges are binarized. Then they are shaded off and again binarized so that the neighboring edge regions connect. The region overlapping with the oval mask and the edge adjustment object which is the region not overlapping with the oval mask are extracted through labeling. The labeling result is output to the protection region extraction part 110B.

In the protection region extraction part 110B, the protection object region is extracted so as to protect regions such as a hair which are not the processing object regions.

When the edge regions, the positive edge binarization information, and the labeling results are input from the edge region extraction part 110A, the labeled regions are rated according to the size and the blending ratio is set, so that the large edge regions have a low density and the small edge regions have a high density, in the protection region extraction part 110B. The blending map with the positive edge binarization information and the blending ratio set is then output to the addition edge generation part 110C.

In the protection region extraction part 110B, the regions connecting with the oval mask, and unnatural regions are removed through the closing processing. The largest region among the regions not connecting with the oval mask is extracted as the interpolation object region, and the extracted largest region is binarized (protection section: 0, interpolation section: 255) and output to the region interpolation part 110D and the original image replacement part 110E.

In the addition edge generation part 110C, an addition edge region which covers the image resolution visually sensed which is lost in the interpolation is generated, as the interpolation of the processing object region alone makes the region unnatural.

In the addition edge generation part 110C, a plane gray image without edges is generated, and alpha blending is done to the gray image and the edge region extracted in the edge region extraction processing part 110A using the blending map generated in the protection region extraction part 110B. The edge image after the alpha blending is output to the region interpolation part 110D.

In the region interpolation part 110D, modification is done on the boundary value between the large region extracted in the protection region extraction part 110B and the region around the large region, and edge addition after the interpolation is done, so that the interpolation is done on the processing object region without unnaturalness.

In the region interpolation part 110D, first, a regression analysis is performed on the boundary values between the interpolation section of large regions extracted in the protection region extraction part 110B and the region around the section in the YUV region cropped in edge region extraction processing part 110A, and values extremely deviating are corrected. The regression analysis is done to calculate the rate (reliability) of region without linear correlation, and the processing is cancelled in the region with a low reliability which results in unnaturalness. Next, interpolation, such as four-point linear interpolation, for example, is done on the interpolation section in the cropped YUV region, and the section is shaded out with the average filter to prevent minute noises in the interpolation. To maintain the necessary image resolution visually sensed, the edge image generated in the addition edge generation part 110C is added to the interpolation region and the obtained interpolation image is output to the original image replacement part 110E.

In the original image replacement part 110E, the blending ratio of the interpolation image and the original image is determined and the processing object region of the original image is replaced with the interpolation image to prevent unnaturalness after the interpolation.

In the original image replacement part 110E, the differential between the image of the YUV region cropped in the edge region extraction processing part 110A and the interpolation image generated in the region interpolation part 110D is first calculated and binarized with a designated threshold value (I1), and sections which get darker than the original image are extracted. Next, to remove the boundary between the interpolation image and the original image, the protection section of the binarized largest region input from the protection region extraction part 110B is shaded off by the averaging filter (I2), and the blending map is generated through the extraction of I1 from I2. Then alpha blending is done with the generated blending values, and the processing object region of the original image is replaced by the interpolation image.

In that way, the region setting part 109 of the imaging device 1 specifies the melasma region on the basis of the edges detected from the image data of V components of the image data which is obtained by the imaging part 106 and on which the beauty skin retouch processing is performed and the melasma region image detected using the ring filters in four different sizes (detected on the basis of the relation with the pixel value of the surrounding pixels). Also, the mole region is specified on the basis of the edges detected from the image data of Y components and the mole region image detected using the ring filters in four sizes (detected on the basis of the relation with the pixel value of the surrounding pixels). The region excluding eyes, eyebrows, a nose, a mouth, etc. is set as the processing object region from the specified region.

Accordingly, the image region to be processed can be set with high precision, without the particular region to be excluded from the processing object not being set as the processing object region.

Modification Example 1

In the above embodiment, the region interpolation processing is cancelled for regions where the calculation result of the regression analysis of the boundary values between the interpolation section of the large region extracted in the protection region extraction part 110B and the region around the section in the cropped YUV region has no linear correlation and a low reliability, as it is likely to result in unnaturalness in the interpolation. Alternatively, pixels on the boundary of the processing object region are consecutively checked one by one, and pixels abruptly darker than the surrounding ones are determined to be a region including hair, that is, a protection region. In that case, pixels in the skin color checked right before the pixels darker are replaced with the pixels on the surrounding boundary, or the darker pixels are replaced with new ones generated from the surrounding pixels through interpolation processing. The replaced pixels on the surrounding boundary may then be used for the linear interpolation algorithm of removal.

Modification Example 2

In addition to the above embodiment, pixels on the boundary of the mole or melasma region in the processing object region may be checked and edges with pixels with values smaller than the surrounding pixels are to be extracted, as interpolation may be done on a region of hair by mistake when the processing object region includes hair in the interpolation processing of the mole or melasma region. The level of the extracted edge is lowered in the mole region where no edge is detected as a result. The usual edge addition is done to the melasma region where no edge is detected. In that way, in a case where a thick hair is on the processing region, the thick hair is left unprocessed, as the edge level is high and the edge region to be detected is larger.

The embodiment described above is a suitable example of the imaging device in accordance with the present invention, and the scope of the present invention is not limited thereto.

For example, in the embodiment explained above, the interpolation processing is performed on the set processing object region. However, the processing to be performed on the set processing object region may be other processing and not limited to the interpolation processing.

In the above embodiment, the melasma region and mole region are detected using ring filters in four sizes. However, a particular region may be detected on the image data of Y components or V components, without using ring filters (ex. A region of pixel values different from the surrounding pixels (sporadic pixel value) is detected as a particular region.), and whether the region includes a melasma or mole may be determined according to the size of the particular region. The particular region including a melasma or mole is then set as the processing object region.

In the above embodiment, the image processing device included in the imaging device is used as an example for explanations, though the image processing device in the present invention may be separate from the imaging device. For example, the image processing device may perform the processing explained with reference to FIGS. 2 to 6 on the image data received from the imaging device.

In the above embodiment, the processing object region is set and the interpolation processing is performed on the YUV image data. However, the type of the image data is not limited.

In the above explanations, a hard disk, a semiconductor non-volatile memory, etc. are disclosed as the computer readable medium storing the program in accordance with the present invention, though not limitative in any way. As other computer readable media, a portable recording medium such as a CD-ROM, etc. may be used. The carrier wave may be used as the medium providing the data of the program in the present invention via the communication line.

Besides, the other particular configurations and operations of each unit of the imaging device may be suitably modified as long as not deviating from the scope of the invention.

The embodiments described above should not be construed to limit the present invention, and the claims and other equivalents thereof are included in the scope of the invention.

What is claimed is:

1. An image processing device comprising:
an acquirer which acquires a face image; and
a controller, wherein the controller:
generates an image depicted by at least one of multiple kinds of parameter making up a color space based on the face image acquired by the acquirer,
detects a particular image region in relation to surrounding pixels in the face image by setting multiple sizes of the particular image region each of which is smaller than a size of the face image based on the generated image, and
sets the detected particular image region as a region on which a designated processing is to be performed.

2. The image processing device according to claim 1, wherein:
the multiple kinds of parameter define a specific direction of a color difference component, and
the controller sets the detected particular image region as the region on which the designated processing is to be performed based on a size of the particular image region and an edge detection result of the image of a particular direction of the color difference component.

3. The image processing device according to claim 1, wherein the particular image region is a local region of melasma in the face image.

4. The image processing device according to claim 1, wherein:
the multiple kinds of parameter are a luminance component, and
the controller sets the particular image region as the region on which the designated processing is to be performed based on a size of the detected particular image region and an edge detection result of the luminance component.

5. The image processing device according to claim 1, wherein the particular image region is a region in which a mole exists in the face image.

6. The image processing device according to claim 1, wherein the controller sets multiple kinds of size of the particular image region to be detected using ring filters in multiple sizes provided in advance, to detect the particular image region in relation to the surrounding pixels in the face image.

7. An image processing device comprising:
an acquirer which acquires a face image; and
a controller, wherein the controller:
generates an image depicted by at least one of multiple kinds of parameter making up a color space based on the face image acquired by the acquirer,
detects a particular image region in relation to surrounding pixels in the face image based on the generated image,
determines a size of the detected particular image region, and
sets the detected image region as a region on which a designated processing is to be performed based on the determined size of the detected particular image region.

8. An image processing method comprising:
acquiring a face image;

generating an image depicted by at least one of multiple kinds of parameter making up a color space based on the acquired face image;

detecting a particular image region in relation to surrounding pixels in the face image by setting multiple sizes of the particular image region each of which is smaller than a size of the face image based on the generated image; and setting the particular image region detected in the detecting as a region on which a designated processing is to be performed.

9. An image processing method comprising:

acquiring a face image;

generating an image depicted by at least one of multiple kinds of parameter making up a color space based on the acquired face image;

detecting a particular image region in relation to surrounding pixels in the face image based on the generated image;

determining a size of the detected particular image region; and setting the particular image region detected in the detecting as a region on which a designated processing is to be performed based on the determined size of the particular image region.

10. A non-transitory computer readable recording medium storing a program which causes a computer to:

acquire a face image;

generate an image depicted by at least one of multiple kinds of parameter making up a color space based on the acquired face image;

detect a particular image region in relation to surrounding pixels in the face image by setting multiple sizes of the particular image region each of which is smaller than a size of the face image based on the generated image; and set the particular image region detected in the detecting as a region on which a designated processing is to be performed.

11. A non-transitory computer readable recording medium storing a program which causes a computer to:

acquire a face image;

generate an image depicted by at least one of multiple kinds of parameter making up a color space based on the acquired face image;

detect a particular image region in relation to surrounding pixels in the face image based on the generated image;

determine a size of the detected particular image region; and set the particular image region detected in the detecting as a region on which a designated processing is to be performed based on the determined size of the particular image region.

* * * * *